United States Patent [19]

Doerfler et al.

[11] Patent Number: 4,670,812
[45] Date of Patent: Jun. 2, 1987

[54] SYSTEM FOR MONITORING THE OPERATING CONDITION OF A SWITCH TO PREVENT OVERSTRESS

[75] Inventors: Rudolf Doerfler, Erlangen; Kurt Krause; Gerd Kummerow, both of Berlin, all of Fed. Rep. of Germany; Boudewijn Moerman, Dormitz, Netherlands; Rudolf Schnabel, Fuerth, Fed. Rep. of Germany; Gerhard Schroether, Amberg, Fed. Rep. of Germany; Rolf Voigt, Munich, Fed. Rep. of Germany; Georg Weidner, Amberg, Fed. Rep. of Germany; Lothar Zentgraf, Uttenreuth, Fed. Rep. of Germany

[73] Assignee: Siemens Aktiengesellschaft, Munich and Berlin, Fed. Rep. of Germany

[21] Appl. No.: 684,915

[22] Filed: Dec. 21, 1984

[30] Foreign Application Priority Data

Dec. 27, 1983 [DE] Fed. Rep. of Germany ....... 3347185

[51] Int. Cl.$^4$ .............................................. H02H 3/42
[52] U.S. Cl. ...................................... 361/83; 361/89; 361/94
[58] Field of Search ....................... 361/24, 79, 89, 94, 361/97, 83, 18, 78, 86, 87, 88, 91, 93; 307/125; 323/276

[56] References Cited

U.S. PATENT DOCUMENTS 3,594,557 7/1971 Anderson ...................... 361/89 X
3,634,871 1/1972 Siedband ........................ 361/89 X
4,012,669 3/1977 Gelfand et al. .................... 361/97
4,513,342 4/1985 Rocha ............................... 361/94
4,527,214 7/1985 Hattori et al. ................. 361/94 X

FOREIGN PATENT DOCUMENTS 1936552 3/1971 Fed. Rep. of Germany .
2640921 3/1978 Fed. Rep. of Germany .
2727378 1/1979 Fed. Rep. of Germany .
1420279 10/1965 France .
1035328 11/1963 United Kingdom .

Primary Examiner—A. D. Pellinen
Assistant Examiner—T. DeBoer
Attorney, Agent, or Firm—F. W. Powers; J. L. James

[57] ABSTRACT

The invention concerns a system for monitoring the operating condition of a switch by utilizing one or more integrating stages to determine the switching capacity and prevent overstresses. One or more monitoring devices for current, switch action rate, arc quench chamber insulation, contact condition, mechanical condition, operating temperature, or contact voltage are provided, which report the equipment condition, particularly the switching capacity. The sensors are functionally connected with the switchgear drive via a processing stage. The current sensors, together with a counting device, can report the $\int$ i.n.dt, i.e. a measure of the stressing of the switch, and in doing so can disable the drive of the equipment. The invention serves the early detection of switchgear which is no longer fully operational, so that these can be replaced before an overstress occurs.

9 Claims, 1 Drawing Figure

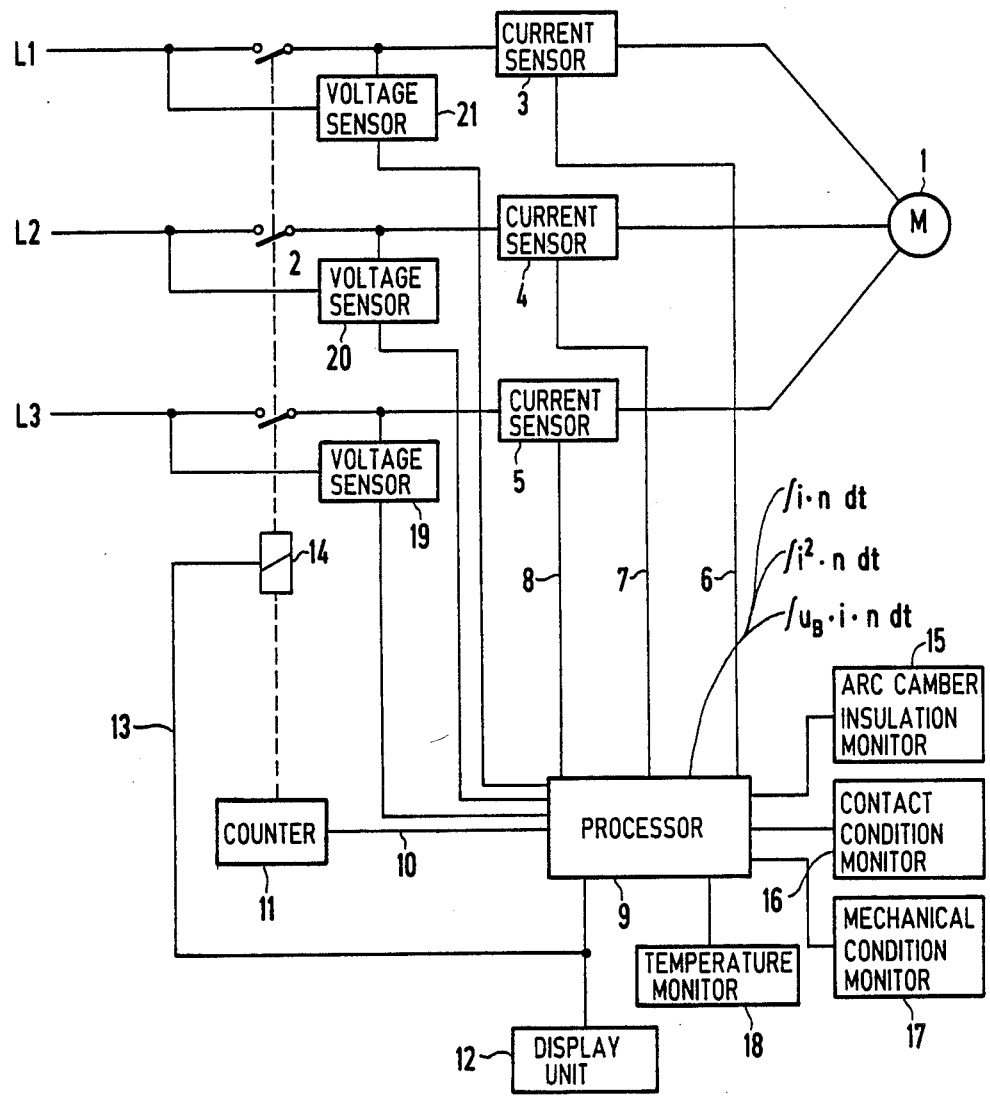

SYSTEM FOR MONITORING THE OPERATING CONDITION OF A SWITCH TO PREVENT OVERSTRESS

BACKGROUND OF THE INVENTION

The invention concerns a system for monitoring the operating condition of switches, more particularly for a system which uses a processing stage to receive various inputs relating to operating condition and processes them to determine if the switch should be disabled from operation.

With one known system of the above type (DE-OS No. 1 936 552) the time-current integral of a capacitor discharge is measured, for example, by a magnetic motor counter. In this case, however, it is still necessary to read the counter. Such tasks are more reliably and cost effectively performed by electronic processors.

SUMMARY OF THE INVENTION

The purpose of this invention is to provide a device to automatically disable the supply of power to an attached load whenever the switch connecting the power would be overstressed. This is achieved in a straightforward manner by having in a first aspect of the invention, integrating stages and current, voltages and operating cycle monitoring devices functionally connected with the switch drive via a processing stage. The processing stage examines the inputs to determine present load conditions and integrates the inputs to determine the switch's present operating capability. If the present load exceeds present capability, then the switch drive is disabled, preventing or removing the power supply to the load.

In a second aspect of the invention, with little extra cost, the remaining operational capability of the switch can be determined even more precisely if a monitoring device for the condition of the quench chamber insulation; and/or if there is a monitoring device for the condition of the contacts, or a monitoring device for the mechanical condition are added to the first aspect.

A third aspect of the invention adds to the configuration of the second aspect, a monitoring device for temperature at the switch and/or at its connecting leads; therefore, reductions in switch capacity by surrounding temperatures can also be taken into account.

The monitoring in the three aspects can be done most cost effectively if the data of all the monitoring devices are fed to a microcomputer or microprocessor serving as the processing stage.

BRIEF DESCRIPTION OF THE DRAWING

While the specification concludes with claims particularly pointing out and distinctly claiming the subject matter which is regarded as the invention, it is believed that the invention will be better understood from the following description of the embodiments taken in conjunction with the accompanying drawing in which:

FIG. 1 is a schematic diagram of the device showing all three embodiments (since the first and second embodiments are sub-combinations of the third embodiment), connected to a three-phase motor.

DESCRIPTION OF THE EMBODIMENTS

An explanatory example of the invention's functioning is given below, with reference to the diagram.

In FIG. 1, motor 1 can be connected to phases L1, L2, L3 by means of a contactor switch 2. In the first embodiment, voltage sensors (19, 20, 21) are assembled parallel with the contacts of contactor 2 and measure the contact voltage $u_B$. Current sensors 3, 4, and 5 are installed between the contacts of the switch 2 and the motor connections, and the current sensor output signals (current i) are fed over lines 6, 7, and 8 to a processing stage 9. The processing stage contains an integrating unit and is fed the initial value, 10, of a counting device 11 which registers the number of switching actions, n, of the switch 2.

If the $\int i.n.dt$ or the $\int i^2.n.dt$ or the $\int u_B.i.n.dt$ exceeds a presettable value during a presettable time interval, i.e. if the maximum load of the switch is reached, then the coil 14 of the switch 2 is disabled by means of lead 13. Simultaneously, an indication of the condition is shown on a display panel 12. the display 12 can also be designed so that it indicates, in accordance with the maximum value of $\int i.n.dt$ or $\int i^2.n.dt$ or $\int u_B.i.n.dt$ the remaining switch-load, which the switch can tolerate.

The counting device 11 makes possible, furthermore, the monitoring of normal operational switching, i.e. it can serve as an indicator for preventive maintenance of the switch. Current sensors 3, 4 and 5 can be used at the same time for monitoring operating currents, i.e. overcurrent and short circuits, and—through the processing stage 9—for disconnecting the switch contacts.

In a second embodiment, the processing stage 9 (which can also take the form of a microprocessor or microcomputer) can further be connected with monitoring devices 15, 16 and 17, which are for, respectively, the insulation condition of the arc quench chamber; for the condition of the contacts; and for the mechanical condition of the switch. A third embodiment adds to the configuration of the second embodiment a monitoring device for the temperature at the switch and/or at its connecting leads. Monitoring the condition of the switch with individual components 15 through 18 has the advantage that the display 12 can indicate which part of the switch is nearing the limits of its capacity. This means that when the contacts have operated a certain reasonable amount, this can be indicated by the display 12, and after a change of contacts the switch can resume normal operation. A similar situation can arise when switch operation is halted by the condition of the quench chamber insulation. Following appropriate indication by the display, the quench chamber could be exchanged.

Thus by means of the invention, breakdowns are prevented which occur due to the connection of a load by switch which does not have sufficient capacity to carry it.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A system used in monitoring the operating condition of a switch and to determine the switching capacity comprising:
    monitoring devices used in monitoring the current flowing through the switch, the number of switch action cycles, the insulation condition of the switch arc quench chamber, the condition of the switch contacts, and the mechanical condition of the switch;

at least one integrating stage connected to said monitoring devices used in evaluating from said devices the operating condition of the switch;

a processing stage connected to said monitoring devices and said integrating stage used in determining the operating condition of the switch, and designed for connection to a switch, having the capability to render said switch in the open position; and voltage monitoring devices used in measuring the voltage across the switch, connected to at said least one integrating stage, whereby the switching capacity is determined by the integral with respect to time of the product of said current flowing through the switch, said voltage across said switch, and the number of switch action cycles during the integration interval;

the system provides an output for use with a switch which disables delivery of current and voltage by the switch to a load.

2. The system, as set forth in claim 1, whereby, the switching capacity is determined by the integral with respect to time of the product of the square of the current flowing through the switch and the number of switch action cycles during the integration interval.

3. A system, as set forth in claim 2, further comprising a monitoring device for monitoring the temperature at the switch and/or at the connections to the switch, connected to the processor.

4. A system, as set forth in claim 2, whereby the processor connected to said monitoring devices is a microcomputer or a microprocessor.

5. A system, as set forth in claim 1, further comprising a monitoring device for monitoring the temperature at the switch and/or at the connections to the switch, connected to the processor.

6. A system, as set forth in claim 5, whereby the processor connected to said monitoring devices is a microcomputer or a microprocessor.

7. A system, as set forth in cliam 1, whereby the processor connected to said monitoring devices is a microcomputer or a microprocessor.

8. A system used in monitoring the operating condition of a switch comprising:

current sensor means for connection to the switch used in producing a signal proportional to the current flowing through each switch contact;

voltage sensor means connected across the switch used in producing a signal proportional to an arc voltage drop across each switch contact;

switch action cycle sensor means connected to said switch producing a signal proportional to the number of switch actions;

processor means connected to said current sensor means, said voltage sensor means and said switch action cycle sensor means used in receiving and processing said signals to provide a first integral with respect to time of the product of said contact current and a rate of said switch actions, a second integral with respect to time of the product of the square of said contact current and said switch action rate, and a third integral with respect to time of the product of said arc voltage, said contact current, and said switch action rate; and said processor means having an operating condition determining means used in comparing the results of said first, second and third integrals, respectively to a first, second and third maximum allowed operating condition;

the system being used in connection with the switch drive mechanism and providing the means used in ensuring the electrical contacts are open whenever one of the maximum allowed operating conditions* is exceeded thereby preventing an overstress condition.

9. A system as set forth in claim 8, whereby the processor means is a microcomputer or a micropressor.

* * * * *